June 6, 1967
W. T. ENGEL ETAL
3,323,633
METHOD AND MEANS FOR SPACING ARTICLES
Filed June 17, 1965
3 Sheets-Sheet 1
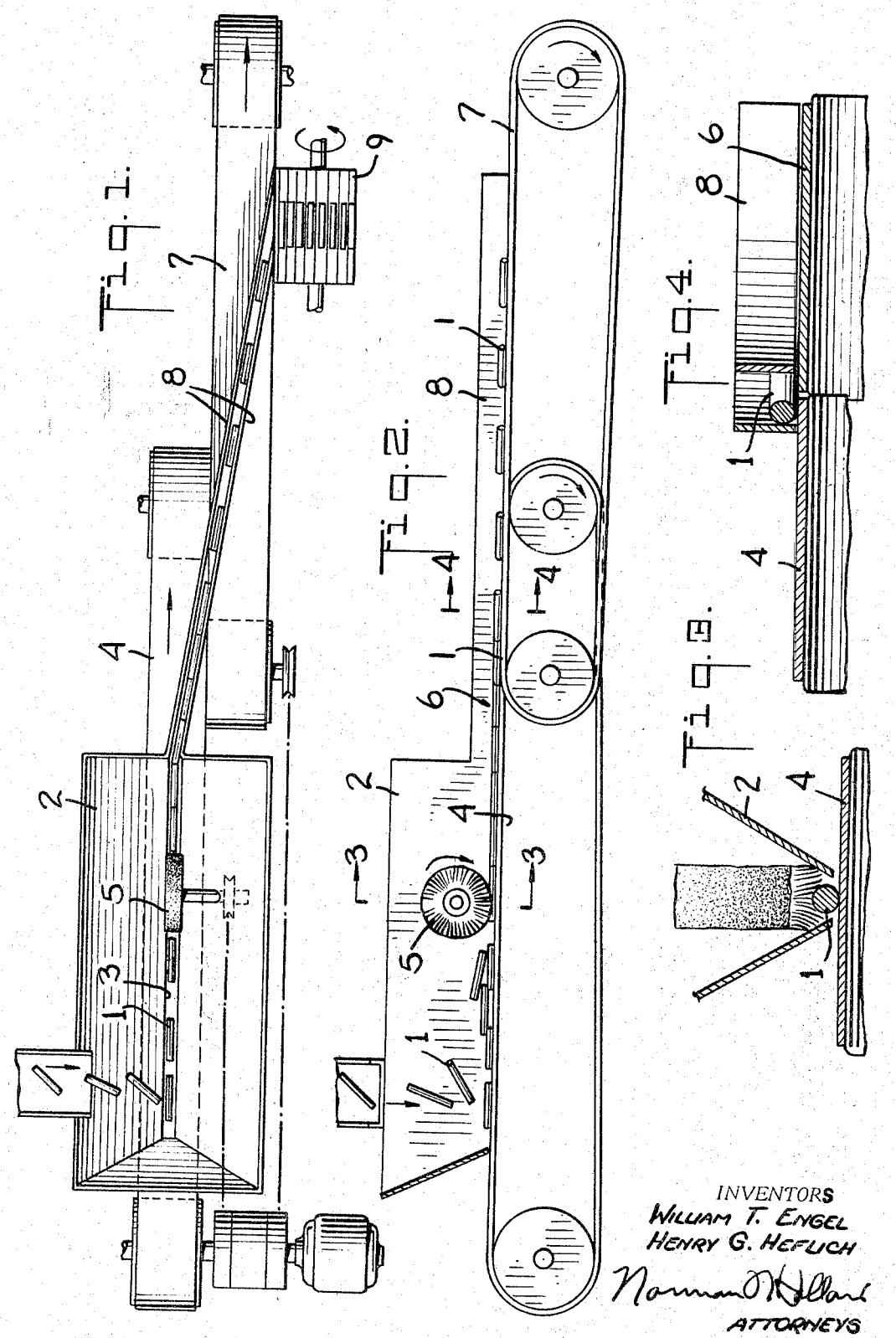
INVENTORS
WILLIAM T. ENGEL
HENRY G. HEFLICH
ATTORNEYS

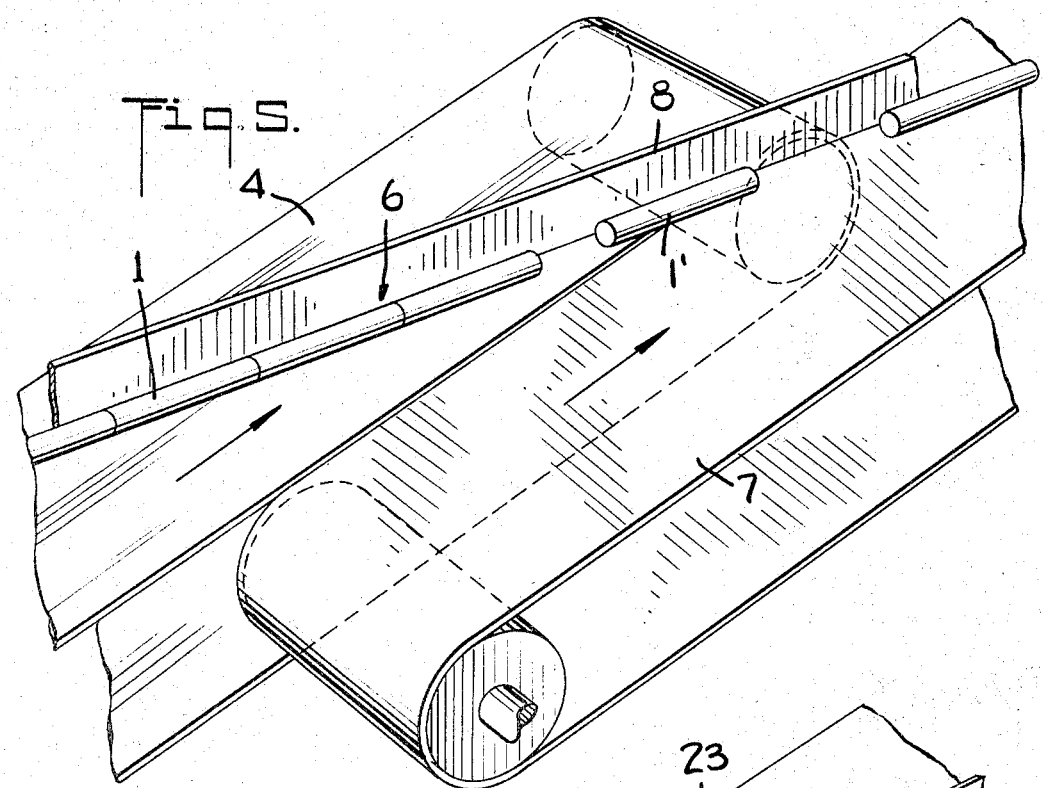
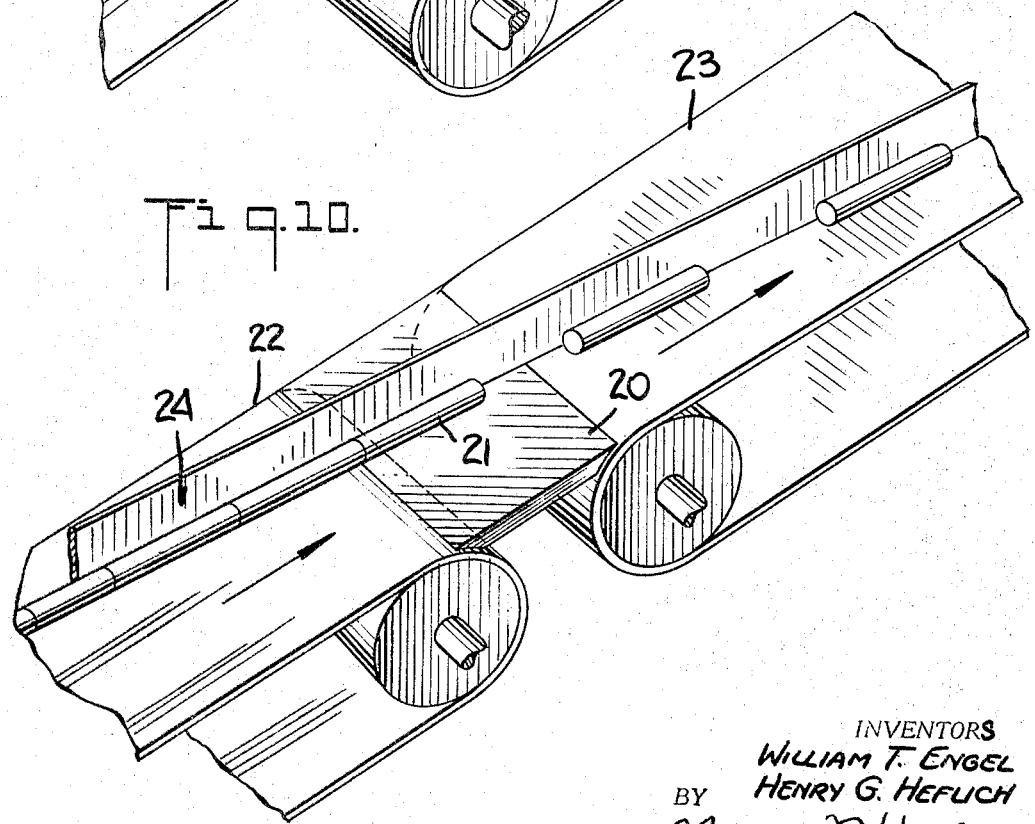

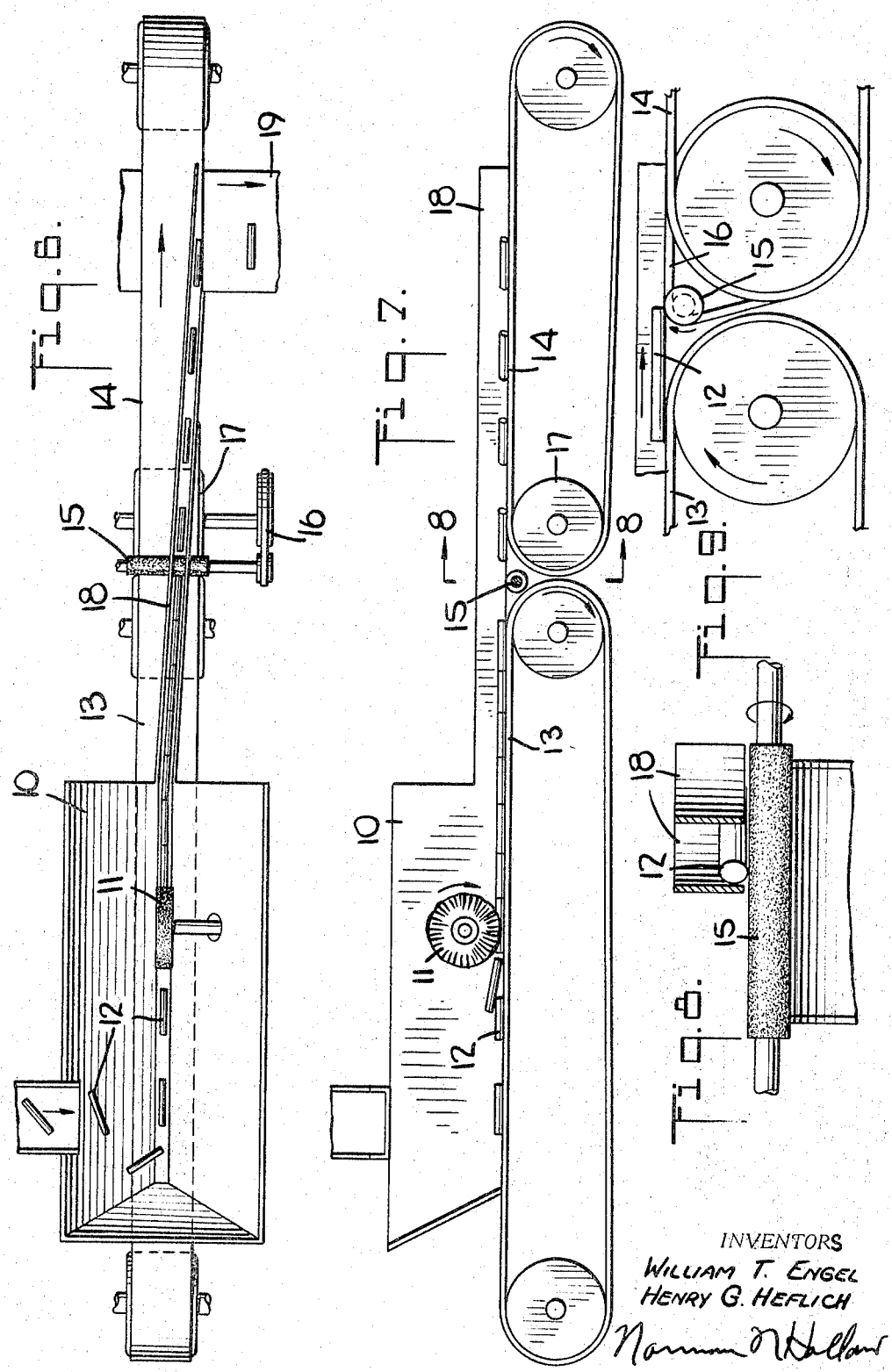

United States Patent Office 3,323,633
Patented June 6, 1967

3,323,633
METHOD AND MEANS FOR SPACING ARTICLES
William T. Engel, Union, and Henry G. Heflich, Ridgefield, N.J., assignors to Kahle Engineering Co., Union City, N.J., a corporation of New Jersey
Filed June 17, 1965, Ser. No. 464,683
4 Claims. (Cl. 198—33)

The present invention relates to a method and means for feeding and spacing articles and more particularly to a method and apparatus for arranging articles and feeding them in spaced relationship and adaptable for continuous operation at variable rates of movement.

There are numerous manufacturing operations where articles are continuously fed into the machines at relatively high speeds and with a pre-determined spacing being required between the articles being fed. One such machine, for example, is a forming machine for glass articles such as vacuum tubes or transistor envelopes. Short lengths of glass in the form of tubing are fed at high speeds into the glass shaping or sealing machines and the handling and feeding of these tubes requires them to be spaced from one another.

The present invention will be described in connection with a feed of this type although it is clear that the spacing method and means described are applicable to numerous other operations where a continuous article spacing action is required.

As will be described more in detail below, the present method comprises an initial aligning and feeding of the articles into a first solid moving line of articles and a subsequent transfer of the articles from the end of the first line to a second line being moved at higher speeds and where the spacing action is obtained by an acceleration in the rate of movement of the articles.

Accordingly, an object of the present invention is to provide an improved method and means for spacing articles.

Another object of the present invention is to provide a continuously operating high speed method and means for feeding and spacing articles.

Another object of the present invention is to provide a relatively simple and effective article spacing device.

Another object of the present invention is to provide an improved article spacing and feeding means having relatively simple adjustments for varying the spacing between the articles as well as the rate of feed.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a top plan view illustrating a preferred embodiment of the spacing device;

FIG. 2 is a side elevational view of the spacing device of FIG. 1;

FIGS. 3 and 4 are sectional views taken along lines 3—3 and 4—4 on FIG. 2;

FIG. 5 is an enlarged fragmentary perspective view of the spacing device of FIG. 1 illustrating the spacing action;

FIG. 6 is a top plan view of another embodiment of the spacing device;

FIG. 7 is a side elevational view of the spacing device means of FIG. 6;

FIG. 8 is a sectional view taken along lines 8—8 of FIG. 7;

FIG. 9 is an enlarged fragmentary side elevational view of the spacing portion of the device of FIGS. 7 and 8; and FIG. 10 is an enlarged fragmentary perspective view illustrating an additional embodiment of the spacing device.

The method and apparatus will now be described in connection with a machine for spacing short lengths of glass tubing such as might be used in the manufacture of a vacuum tube or transistor envelope. It is clear that the spacing method and apparatus may be used with a variety of articles having other sizes and made of other materials.

FIG. 1 shows glass tubes 1 being fed at approximately the rate at which they are to be used into a supply trough 2 having a slot 3 in its bottom exposing each of the tubes 1 to the upper surface of a moving conveyor 4. The tubes 1 may be fed intermittently and from one or more sources as long as enough tubes are supplied to maintain a line of a few tubes at the exit end of the conveyor 4. The trough 2 preferable has a tapered or generally V-shaped form in cross-section to cause the alignment of the tubes 1 on the conveyor 4 surface in the direction of conveyor movement. The conveyor 4 carries the tubes 1 along the open slot 3 in the bottom of the trough 2 and moves the tubes 1 beneath a rotating brush or soft wheel 5 whose surface is moving in the opposite direction from the conveyor 4 so that the wheel 5 prevents the tubes from stacking up on the moving conveyor 4.

As best illustrated in FIGS. 4 and 5 the forward end of the line 6 of the tubes 1' is directed by guide rails 8 to move the endmost tube 1' off of the first conveyor 4 and onto a second conveyor 7 being driven at a higher speed than the first conveyor 4. As soon as a portion of this endmost tube 1' rests on the faster moving conveyor 7, the entire tube 1' is accelerated and moved away from the next tube on the feed line 6 at a higher speed than that at which the next tube is traveling thereby resulting in a spacing of the successive tubes 1 from each other.

The relative speeds of the two belts 4 and 7 is adjusted to obtain the desired spacing between the tubes 1 and this spacing may be set by observation and trial where articles are being spaced for the first time or by pre-determined belt speed settings where the desired spacing and belt speeds have previously been determined. The exact spacing obtained with differing belt speed differentials depends upon the surface finish of the article being spaced as well as upon the belt surface being used, however, the spacing obtained will remain relatively constant as soon as the machine has reached a stabilized operating condition for any particular belt speed differential and article.

The spaced tubes 1 or other articles on the second conveyor 7 may be fed directly into the utilizing machine or they may be transferred to another tube transporting means such as an additional conveyor or chute which will receive the tubes and transport them preferably with a continuing article spacing equal to or proportional to the original spacing obtained on the second conveyor 7.

In FIG. 1 the tubes 1 are shown being fed to a compartmented feeder wheel 9 which is illustrative of a transfer means to move the tubes or articles into a subsequent processing machine. In certain article handling operations it is necessary to space the ends of the articles from one another to permit a transfer of the articles from a line to another feeder such as the wheel 9 of FIG. 1 and with the spacing being required to prevent interference between adjacent article ends as they are moved out of line from the conveyor 6 to the wheel 9. In this case only a small clearance is required between the article ends sufficient to prevent interference and the belt speed differential may be relatively small.

Another embodiment of the spacing apparatus is illustrated in FIGS. 6 through 9. In this embodiment the articles to be spaced are fed into a trough 10 including a wheel 11 for preventing stacking of the articles. The articles 12 now, however, pass in a generally longitudinal direction from a first conveyor 13 to a second conveyor 14 moving at a higher speed.

The embodiment illustrated in FIGS. 6 through 9 includes a rotating spindle 15 positioned between the adjacent ends of the two conveyors 13 and 14. This spindle 15 facilitates the transfer of the articles 12 from the low speed conveyor 13 to the high speed conveyor 14 and its surface is preferably moving at the same speed or at a higher speed than the surface speed of the second or higher speed conveyor 14. The spindle 15 in FIG. 9 is shown connected by a drive belt 16 to the end pulley 17 for the high speed conveyor 14 so that its surface is moving at approximately the same speed as the second conveyor 14.

The spindle 15 preferably has a friction material such as rubber on its drive surface to facilitate the acceleration of the articles being spaced. In the embodiment shown in FIG. 6, the articles arriving at the end of the second conveyor 14 are transferred by suitable guide rails 18 to a conveyor 19 for movement to a processing means in spaced parallel relation to each other.

The embodiment illustrated in FIGS. 1 through 5 as well as the embodiments in FIGS. 6 through 10 have been found capable of providing a spacing of articles such as glass tubing by an amount greater than the length of the tube where the speed of the second conveyor is about two times or more the speed of the first conveyor. Additional spacing may be obtained by increasing the differential in the belt speeds or by providing a more rapidly rotating spindle 15.

FIG. 10 illustrates a further embodiment generally similar to the embodiment of FIG. 6 where the rotating spindle 15 is replaced by a stationary transfer plate 20 having a low friction surface. This plate 20 facilitates movement of the endmost article 21 by a low speed conveyor 22 forward to the point where the article is engaged and accelerated by the second conveyor 23. It will be seen that the endmost article 21 is moved across this low friction plate due to its engagement with the solid advancing line of articles 24 on the conveyor 22. As soon as the front end of this endmost article 21 engages the friction surface of the high speed belt 23, it is readily pulled onto the more rapidly moving belt since the low friction plate 20 exerts a minimum drag on the rear portion of the endmost article 21. The low friction plate, thus, approximates the action of the spindle 15 moving at the speed of the second conveyor and may be used for lower speed feeds and for shorter spacing. Where extremely high speed feeds are required and where it is desired to provide a spacing greater than the length of the articles being spaced, the use of a rotating spindle driven at a relatively high speed is preferable.

It will be seen that a relatively simple and effective spacer has been provided for simultaneously feeding and spacing articles. The spacer is easily adjusted for varying speeds of article feed as well as for providing a wide range of adjustments in the spacing between the moving articles. The adjustments or changes in the rate of article feed and in the spacing provided between the moving articles are continuously adjustable between broad limits as the spacing achieved using differential belt speeds and without the use of feed pockets or spacing bars or other such article spacing members.

The spacing device is useful for a wide variety of article sizes and articles of differing materials. It may be used advantageously for fragile or relatively light weight articles as the spacing is achieved by a smooth handling operation consisting principally of an acceleration in the article speed. This method produces spacing without stress or strain on the spaced articles and may be used as indicated for glass or other fragile articles.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A spacing and feeding means for elongated articles comprising the combination of a first article conveyor, an article feeding hopper having an elongated article outlet above the first article conveyor and aligned axially thereof, a pair of spaced guide rails beyond said hopper for aligning articles on the first article conveyor in single file relationship, means for driving said first article conveyor for moving the articles on said first article conveyor between said guide rails into abutting relationship, a wheel positioned with a lower surface positioned in said hopper and spaced above said first conveyor, means for driving the lower surface of the wheel in the opposite direction to the first conveyor for limiting the line of articles to one layer, a second article conveyor having a portion positioned alongside a portion of the first article conveyor beyond said hopper, means to drive said second conveyor at a higher speed than said first conveyor and in the same direction, and said guide rails being directed diagonally across said first and second article conveyors at the said portions thereof for guiding the articles on said abutting line of articles in said guide rails from said first article conveyor to said second conveyor with spacing between successive articles.

2. A spacing and feeding means for elongated articles comprising the combination of a first article conveyor, an article feeding hopper having an elongated article outlet above the first article conveyor and aligned axially thereof, a pair of spaced guide rails beyond said hopper for aligning articles on the first article conveyor in single file relationship, means for driving said first article conveyor for moving the articles on said first article conveyor between said guide rails into abutting relationship, a wheel positioned with a lower surface in said hopper and spaced above said first conveyor, means for driving the lower surface of the wheel in the opposite direction to the first conveyor for limiting the line of articles to one layer, a second article conveyor having its input end spaced from the output end of the first article conveyor and positioned on a level therewith, means to drive said second conveyor at a higher speed than said first conveyor, an article transfer roller positioned intermediate the said conveyor ends having its top on a level with said article conveyors, and means for moving the roller surface at least at the speed of said second article conveyor for accelerating the forwardmost article on said abutting line of articles in said guide rails and for moving it from said first article conveyor to said second for forming a spaced line of articles thereon.

3. The means as claimed in claim 2 in which said means for moving the roller surface move it at a higher speed than the speed of the second conveyor.

4. The means as claimed in claim 2 in which said roller has a friction coating on its surface.

(References on following page)

References Cited

UNITED STATES PATENTS

| | | | |
|---|---|---|---|
| 528,095 | 10/1894 | Hisey | 221—171 X |
| 791,243 | 5/1905 | Carlson | 198—30 |
| 915,542 | 3/1909 | Biertuempfel | |
| 1,752,540 | 4/1930 | Olson | 198—34 |
| 1,959,238 | 5/1934 | Horsfield | 198—34 X |
| 2,383,270 | 8/1945 | Niederer et al. | 198—34 |
| 2,650,010 | 8/1953 | Moore | 198—34 X |
| 3,212,621 | 10/1965 | Daugherty | 198—34 X |

FOREIGN PATENTS 415,844  7/1925  Germany.

EVON C. BLUNK, *Primary Examiner.*

M. L. AJEMAN, *Assistant Examiner.*